June 17, 1941.  J. S. BAKER  2,245,957
COOKER
Filed Feb. 19, 1940  5 Sheets-Sheet 5

INVENTOR.
John S. Baker
BY
Alexander Dowell
ATTORNEYS

Patented June 17, 1941

2,245,957

UNITED STATES PATENT OFFICE 2,245,957

COOKER

John S. Baker, Los Angeles, Calif.

Application February 19, 1940, Serial No. 319,782

24 Claims. (Cl. 126—272)

This invention relates to automatic continuous cookers, such as used in the canning industry for cooking fruits and vegetables after they are hermetically sealed in cans. Cookers of this type are known as open process cookers because no steam pressure is set up in the tank or heating chamber, the cooking being effected at the boiling point of water, i. e., 212° F., the tank being filled about one-fourth full of water which is heated by steam pipes in the bottom of the tank. In such cookers steam from the boiling water rises upwardly between the cans and cooks the foods therein as they are continuously passed along the coiled canway towards the discharge end. Many cookers of this type are in operation, but can only cook such fruits and vegetables as can be cooked at 212° F. No practical method has yet been devised to raise the temperature in open process cookers above the boiling point of water or 212° F. Foods that require higher cooker temperatures are always cooked in separate steam-tight retorts under steam pressure. In canneries many varieties of fruits and vegetables are canned, some requiring cooking in boiling water or 212° F., and others requiring temperatures up to 240° F.

One object of my invention is to provide novel heating means for raising the temperature above 212° F. in open cookers with no steam pressure in the tank, so that all the various fruits and vegetables processed in a cannery can be cooked in the same cooker.

Other objects of my invention are to provide a rotary canway having an outer series of can heating pipes attached thereto so as to rotate therewith, so that in event a bottom pipe should burst or leak the entire canway can be rotated to bring the bursted pipe up to the top of the canway or into other accessible position where it can be repaired; also to provide novel means of pivotally mounting the heating coils against the exterior of the canway in order that the coils may directly impart heat by conduction to the canway, with provision of means for swinging the individual heating coils of the series out of such position to give quick access to the canway for removal of jammed cans, or for remedying other trouble which would interrupt the action of the cooker if not attended to.

Still further objects are to provide novel heating means for the can propeller consisting of inner heating coils fitting tightly against the inside of a cylindrical propeller shell, said coils directly imparting heat by conduction at high temperature to the shell; also to provide a novel can propeller whereby the cylindrical shell is perforated so that when cooking in boiling water, the water will run freely to the bottom of the cylinder while the rising steam will be superheated to a higher temperature than 212° F. by the steam coils, thereby keeping the top of the canway at or above the boiling point of water, thus permitting the cooker to be made of normally larger diameter than before, to prevent the canway from sagging.

Different fruits and vegetables require different lengths of cooking periods. Some require long cooking periods, and others short cooking periods. Cookers must be built large enough, or the canway long enough, to handle the capacity of the cannery for the longest cooking periods. When foods requiring short cooking periods are run, less than half of the canway may be utilized, and therefore an extra feed is placed intermediate the front and end of the single coiled canway or in the center of the canway, although more feeds may be provided at spaced intervals, so that when foods requiring short cooking periods are being processed, at least two lines of cans may be cooked simultaneously, thus doubling the capacity of the cooker. The cans entering the canway from the first feed are discharged at either the first or second discharge with which the cooker is also provided, and cans entering by the center feed are discharged either at the third or last discharge with which the cooker is also provided. When foods requiring long cooking periods, are processed, the center feed is discontinued, and all intermediate discharge doors are or may be closed. The cans fed at the first feed, or the front end of the canway, will then continue past the center feed and discharge at the fourth discharge which is at the opposite end of the canway, the cans travelling twice the distance as when two feeds are used. This arrangement gives double the length of the cooking period without changing the speed of the cans.

Another object therefore of my invention is to provide a single coiled canway with a plurality of feeds at different points, which practically provides a plurality of cookers in one heating chamber for processing foods requiring short cooking periods, with means for discontinuing the intermediate feeds to double the length of travel of the cans for processing foods requiring long cooking periods.

Another object of my invention is to provide a cooker with novel means whereby the entire canway assembly may be turned on its axis so that the bottom portion of the canway or any other hidden part, which would not otherwise be accessible, may be conveniently and quickly turned up to the top of the tank, so that if the canway gets jammed with bent cans at the bottom, or other hidden trouble occurs in the canway that would stop the cooker, such trouble can be quickly and conveniently located and remedied from the top of the tank in a few minutes, by merely turning the canway on its axis until the trouble-containing part of the canway comes to the top. This arrangement renders it unnecessary to drain the water from the tank and cool the cooker, since it obviates the necessity for a man to crawl into the tank to remedy the trouble, also it obviates the necessity of having to lift the entire canway out of the tank; and provides a construction in which there is no fixed bottom to the entire canway construction.

A still further object is to provide a novel feed elevator so constructed that it can be swung out from the tank when the top of the tank is raised and then swung back into place again when the top of the tank is closed without disconnecting any of the elevator parts, the swinging action in no way altering the timing or rate of feeding the cans to the tank with respect to the movement of the cans within the tank by the propeller; also to provide an elevator of the above type which is so constructed that if a can gets into the elevator in an endwise position it will be automatically ejected without stopping the elevator, thus preventing any cans being fed into the canway endwise which would surely cause the cans to jam in the canway of the cooker.

A still further object is to provide a tank constructed in semi-cylindrical halves, and in which the top half or section is hinged so that it may be swung open quickly to give access from the side of the cooker to any canway trouble, instead of access only at the opened top, thus making it unnecessary to shut off the steam and cool partly processed foods.

I will explain the invention with reference to the accompanying drawings, which illustrate one practical embodiment thereof to enable others familiar with the art to adopt and use the same; and will summarize in the claims, the novel features of construction, and novel combinations of parts, for which protection is desired.

Figure 3:
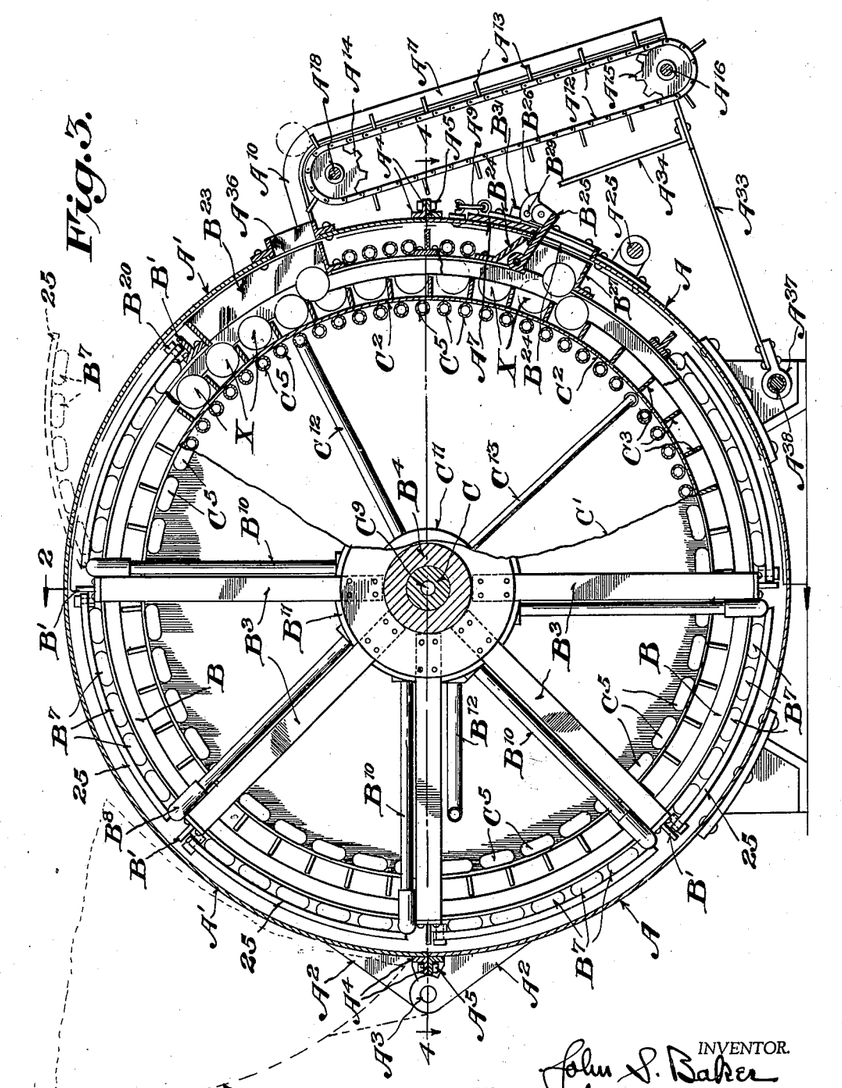
Fig. 3 is a vertical transverse section, partly in elevation, on line 3—3, Fig. 1, showing in end elevation the canway, and in section the can feed and discharge.

The cooker comprises a cylindrical tank casing formed of lower and upper semi-cylindric sections A and A1, closed at their ends, said sections being hinged together along one side edge by means of pintles A2 and a hinge rod A3 as shown in Fig. 3. The meeting side edges of the casing sections, A, A1, are trimmed with angle irons A4 (Fig. 1) and the sections are normally clamped together by bolts A5 passing through perforations in said angle irons.

Opposed semi-circular recesses are provided in each end plate of sections A, A1, adapted to receive and support canway hubs B4 on which the entire canway is journaled in the casing. The canway comprises a continuous T-iron helix B in which the stems of the T-irons point inwardly to form the endwise guides for the cans, the helical pitch being somewhat greater than the length of the cans so that the cans while passing or moving along between the stems of the T-irons will gradually advance to a discharge. The bases of the T-iron coils are secured to spaced longitudinal T-bars B1 disposed exteriorly of the helix B which T-bars B1 properly support the weight of the helix B and maintain proper coil spacing of the canway; and T-bars B1 are riveted at their ends to radial supports B3 (Figs. 2, 3, 4), having their inner ends riveted to a flange of the adjacent hub B4. One hub B4 (Fig. 4) has an annular recess B5 which receives the edge of the recess in the adjacent end plates of sections A and A1, to hold the helical canway B in proper position axially of the tank casing, the semi-circular recesses in said end plates of the sections A, A1, being somewhat smaller than those at the other end of the sections so as to snugly fit the annular groove B5. By the above construction, after the helical canway B is assembled, the top section A1 of the tank is raised as shown in dotted lines in Fig. 3, and the entire assembled canway is placed in position in the casing with hubs B4 freely resting in the semi-circular recesses in the end plates of the lower section A, same being thus freely suspended in the lower section A. The top section A1 may then be lowered and clamped down by the bolts A5.

Canway anchors (Figs. 1, 2, 4) are provided at each end of the casing section A at the front thereof to hold the canway B stationary when the cooker is operating, said anchors consisting of a hollow housing B6 riveted to each end of tank section A and projecting through a hole in the end plate of said section. A plunger 20 is slidable in housing B6, the inner end of the plunger being forked as at 21 to embrace a radial support B3. Each plunger 20 is held in place by a pin 22 (Fig. 4) which passes through aligned perforations in the housing B6 and plunger 20. When plungers 20 are in the positions shown in Figs. 1, 2 and 4, the canway B is locked against rotation and will not turn when the cooker is operating.

Figure 2:
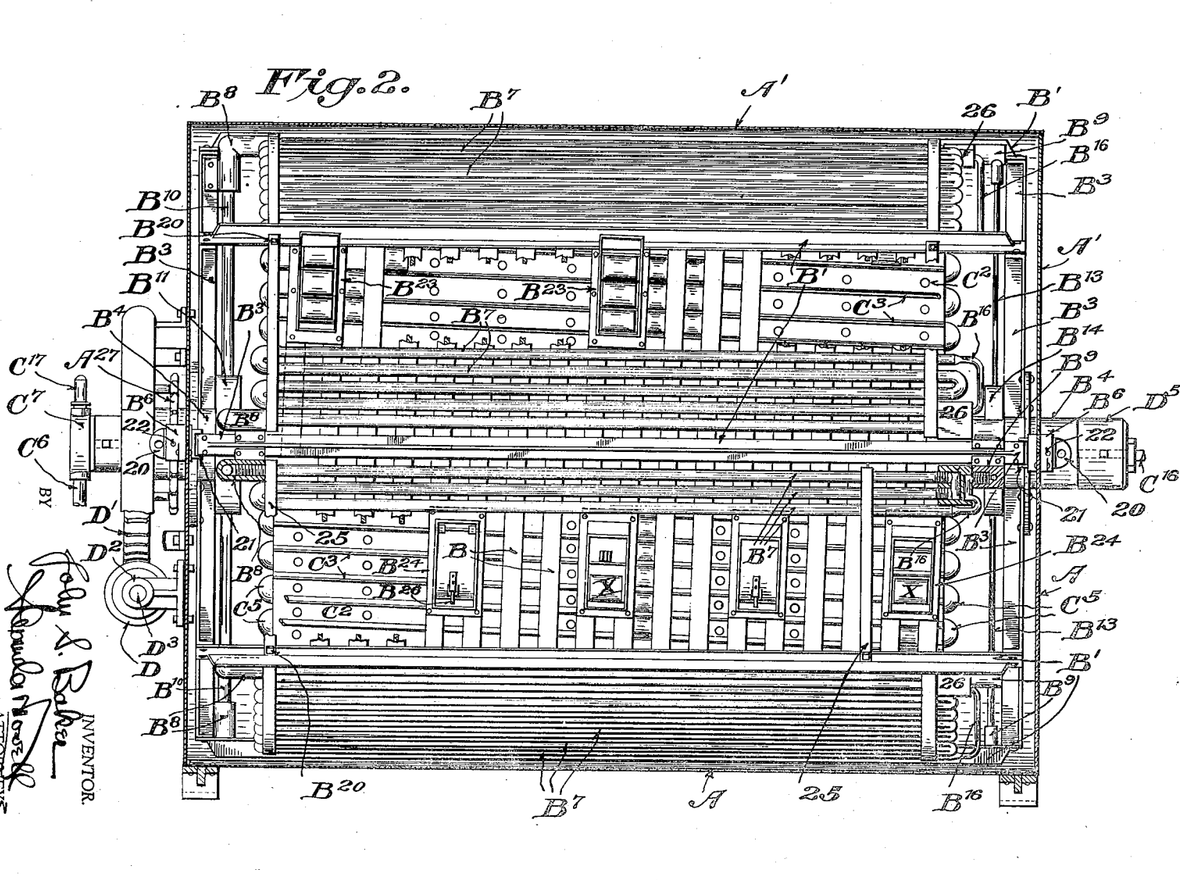
Fig. 2 is a vertical longitudinal section on line 2—2, Fig. 3, the outer casing of the cooker being removed to expose the underlying parts.

Around the outside of canway helix B, fitting tightly against the outer faces of the bases of the T-iron coils to impart by conduction heat directly to the T-irons B, are closed steam coils B7 (Figs. 2, 3 and 6), same being disposed between adjacent T-bars B1. Coils B7 each comprise a pipe section 23 (Fig. 6) threaded at both ends and a coil section 24 secured to section 23 by transverse straps 25 welded or otherwise secured to the sections to form a rigid structure. A swivel casing 26 connects the adjacent ends of sections 23—24, and has a duct 26a registering with the ends of the sections 23—24, and a tubular threaded portion 26b. Coils B7 are swiveled along one side so they may be swung out into the position shown in dotted lines in Fig. 3 to give free access to the helical canway B to remedy any trouble therein. Coils B7 swing on their threaded ends in castings B8, B9 (Figs. 2, 3, 6) of which B8 is the steam feed at inlet end of the coil B7 and is connected by pipe B10 to steam chamber B11 on hub B4 (Figs. 4 and 9), which chamber is fed by steam pipe B12. B9 is disposed at the discharge end of coil B7 to carry off the condensate and drains through pipe B13 into a chamber B14 (Figs. 4 and 10) on hub B4 connected to a steam trap by pipe B15. Coil B7 is drained through pipe B16 (Figs. 2-6) through pass B17 in fitting 26 and into B9. The coils B7 are each clamped down against canway T-bars B1 by bolts B20 (Fig. 2). Fittings B8 and B9 are riveted to the T-bars B1 as indicated in Fig. 2.

Figures 5, 6, 7, 8, 9, 10, 11:
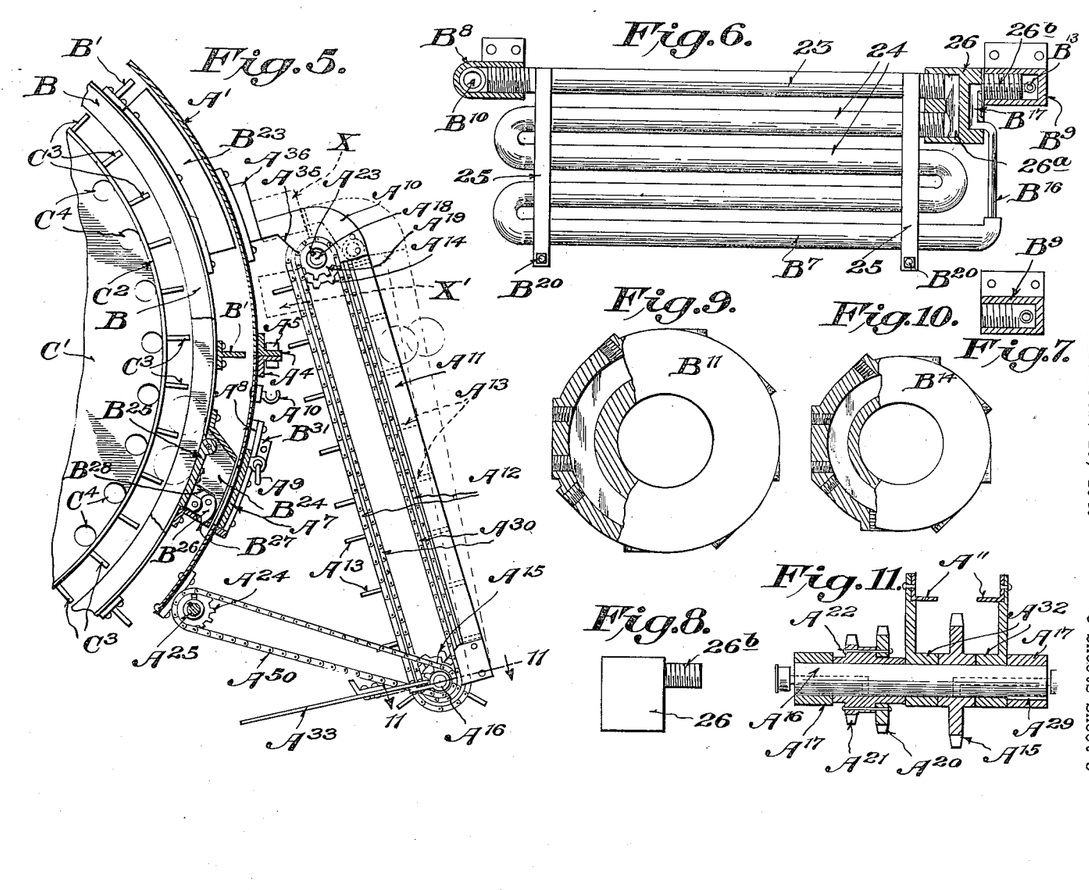
Fig. 5 is a partial vertical section on line 5—5, Fig. 1, and showing in elevation the can elevator.
Fig. 6 is an enlarged plan view, partly in section, showing one of the swingable steam coil units which are mounted on the outside of canway.
Fig. 7 is an enlarged sectional view of the female part of the swivel joint of the unit shown in Fig. 6.
Fig. 8 is an enlarged plan view of the male part of the swivel joint of the unit shown in Fig. 6.
Fig. 9 is an enlarged elevation, partly in section, of the steam chamber for the steam coils of the canway.
Fig. 10 is an enlarged elevation, partly in section, of the steam condensation chamber for the steam coils of the canway.
Fig. 11 is an enlarged sectional view through the feed conveyor drive shaft taken on line 11—11, Fig. 5.

Attached to the outside of the canway B so as to turn with the canway when same is rotated on its axis, are feed chutes B23 and discharge chutes B24 (Fig. 5) which register with suitable ports in canway B. There are shown two feed ports B23 (Fig. 2) and four discharge ports B24 which latter are closed at their inner ends by doors B25 (Fig. 5) and are locked in position by pivoted latch member B26 held in a slot B27 in the port B24, by flat spring B28 (Figs. 3 and 5). In Fig. 3 two lines of cans X are shown being processed simultaneously, the cans from the first feed discharging at discharge #2 (first feed not shown on Fig. 3) and cans from second feed entering to be discharged at #4. Discharge doors B25 for discharges #2 and #4 are shown held open (Figs. 1-3) by pins B29 which fit in latch holes in latch B26 (Figs. 3-5) and through holes in brackets B31 (Figs. 1-3-5) on outside of tank A. Discharge doors #1 and #3 in tank are held closed by sliding doors A7 (Figs. 1-3-6) which slide in guides A8, and are held open by ring A9 hooked over hook A10.

Attached to shaft C (Figs. 3-4) is a rotating can propeller comprising a hollow cylinder forming the inner wall of the canway, same having spaced longitudinal fins on its exterior between which the cans are disposed and are moved along the fins of the propeller until discharged. The can propeller consists of two circular end plates C1 which are imperforate to prevent radiation and are welded to shaft C. Supported upon end plates C1 is a perforated sheet iron cylinder C2 against which the cans X contact when being carried around the canway B (Figs. 2-3-4-5). Secured to the exterior of cylinder C2 are longitudinal fins C3 extending the full length thereof forming pockets in which the cans lying on their sides move endwise. When the can propeller is rotated the cans slide along between adjacent fins C3 propelled by the pitch of canway B until discharged. On the inside of cylinder C2 and held tightly against same by holes C4 (Fig. 5) in end plates C1, are closed steam coils C5 (Figs. 3-4) which lie against sheet C2 and give direct heat thereto by conduction. Coils C5 are supplied with steam through steam pipe C6 leading into steam chamber C7 (Figs. 1-2-4) and through pipe C8 (Fig. 4) into bore C9 in shaft C, and through ports C10 directly into steam head C11 (Figs. 3-4) and from thence through pipes C12 to inlet ends of coils C5. Condensation from said coils is discharged through pipes C13 into exhaust chamber C14, and through a bore C15 in shaft C, and into pipe C16 which leads to a steam trap. A safety valve C17 (Fig. 2) limits the pressure in coils C5.

Figure 4:
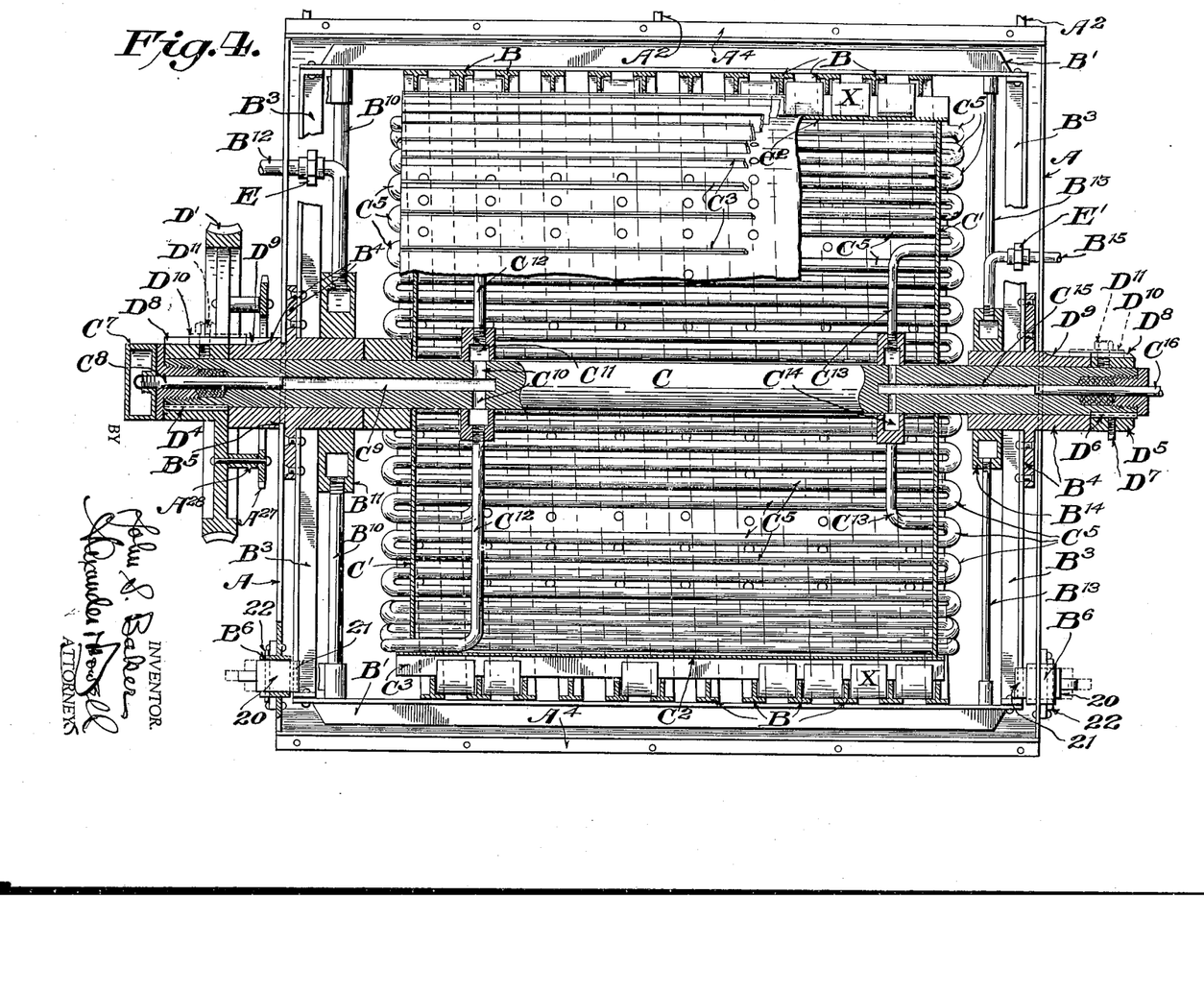
Fig. 4 is a horizontal section on line 4—4, Fig. 3.

The can propeller shaft C is driven by a worm D on a worm shaft D3 mounted in bearings D2 (Figs. 1-2) bolted to the tank end, said worm D being keyed on shaft D3 and is driven by belt or motor as desired. Worm D meshes with a worm gear D1 keyed to shaft C by key D4 (Fig. 4). On the opposite end of shaft C is a collar D5, keyed to shaft C by key D6 and sew screw D7. In the exterior of collar D5 and exterior of worm gear hub D1 are keyways D8, with corresponding keyways D9 cut in the exteriors of hubs B4 and keys D10 shown in dotted lines in Fig. 4 may be placed in keyways D8 and D9 and clamped therein by cap screws D11, also shown in dotted lines, to lock collar D5 to its adjacent hub B4, and worm gear D1 to its adjacent hub B4, and thus interlock the can propeller C and canway B so that when worm gear D1 is rotated the entire canway assembly B will also turn on its axis, i. e., on its hubs B4 which are freely mounted in the recesses in the tank end plates. The plungers 20 of canway anchors B6 (Figs. 1-2-4) must be pulled out as shown in dotted lines in Fig. 4, to release the canway for rotation; and pipe unions E and E1 in the steam pipes B12 and B15 must be uncoupled to permit the canway B to rotate.

Figure 1:
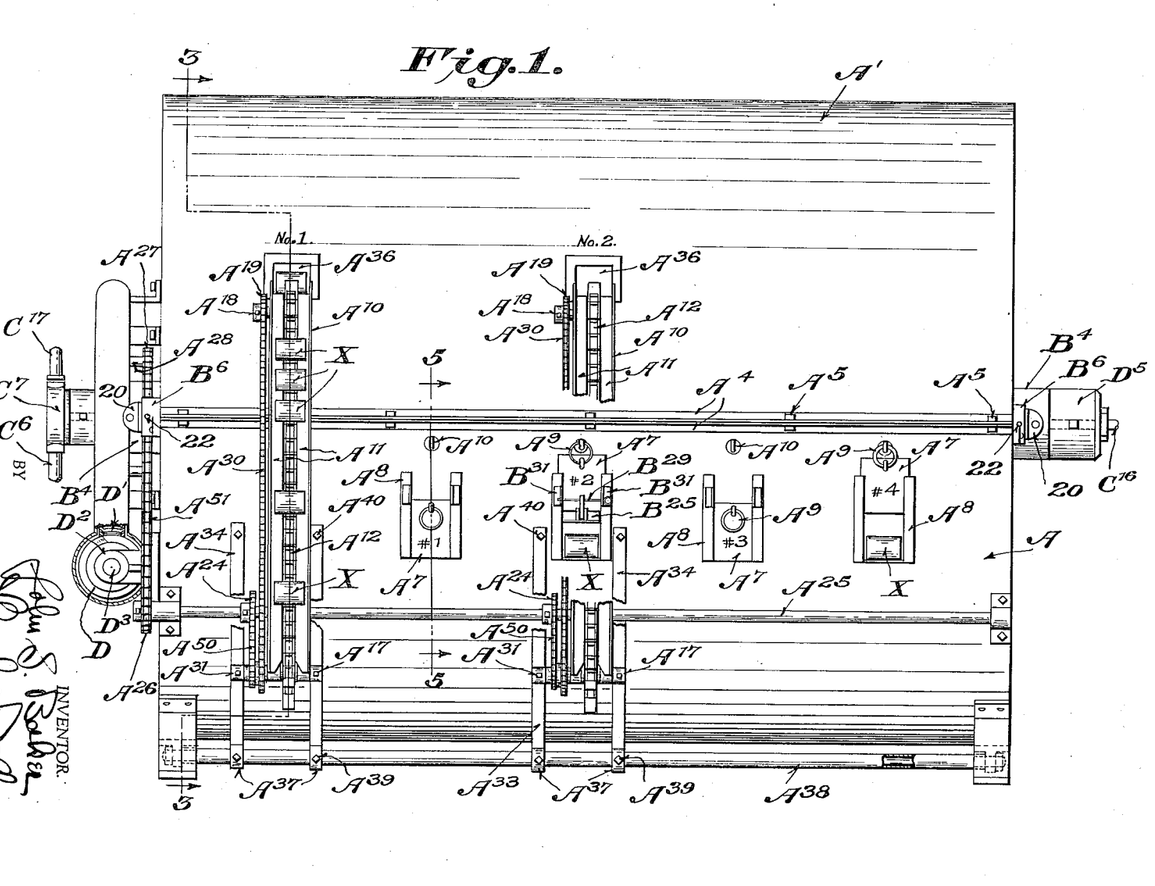
Fig. 1 is a front elevation of the cooker.

On the outside of the tank are feed elevators A10. Two are shown in Fig. 1 each identical in construction and operation, and each comprises a pair of inclined angle iron can tracks A11 (Figs. 1-3-5-11) cooperating with an endless chain A12 with attachments A13 extending out between the tracks to engage the cans X and raise the cans into the feed chute A36 (Fig. 3) where the cans will roll by gravity into feed chute B23 of the canway B. Chain A12 runs over sprockets A14 and A15 (Figs. 3-5), sprocket A15 being loose on shaft A16 (Fig. 11) held stationary in supporting hubs A17, by a key A29, and set screw A31. Two sprockets A20 and A21 are attached together by bolts or rivets A22 (Fig. 11) and rotate freely on shaft A16. Sprocket A20 drives the upper chain sprocket A19 by means of a chain A30. Sprockets A19 and A14 are keyed on shaft A18 by key A23 (Fig. 5) to drive conveyor chain A12, shaft A18 having bearings in brackets A35 (Fig. 5) to which the upper ends of can tracks A11 are riveted. Drive sprocket A21 is driven by sprocket A24 (Fig. 5) and a chain A50, sprocket A24 being keyed on a drive shaft A25 having a sprocket A26 (Fig. 1) driven by a chain A51 running over a sprocket A27 (Figs. 1-2-4) riveted to worm gear D1 as at A28.

Tracks A11 have brackets A32 (Fig. 11) at their lower ends mounted on shaft A16, so that the entire feed elevator A10 may be swung out from the tank as shown in dotted lines in Fig. 5, whereby in event cans should be fed into the elevator A11 endwise, they will strike the end of chute A36, and by the force of movement of the chain ribs A13 against the can end, the upper end of the elevator A11 will be swung away from the tank and said endwise fed can X (Fig. 5) will be automatically ejected, same dropping between the tank and elevator as shown in dotted lines X' in Fig. 5, without stopping chain A12. Elevator A10 is thus freely hinged on shaft A16, and its upper end merely rests against feed chute A36. Hubs A17 of shaft A16 are riveted to braces A33 and A34 (Fig. 3) and support the entire elevator assembly A10. Hubs A37 of braces A33 are mounted on clamp rod A38 (Figs. 1 and 3) and their axial positions are fixed by set screws A39 (Fig. 1). Brace rods A34 are merely bolted to tank at A40 (Fig. 1). The feed elevators A10 never require adjusting.

When two lines of cans are run simultaneously into the two elevators A10, either discharge #1 or #2 must be open to prevent the cans from the first feed from interfering with the incoming cans of the second feed which are discharged from discharge #3 or #4.

To turn canway assembly B on its axis, all discharge doors B25 must first be closed and locked by their latches B26 so that none of the cans in the canway ports can drop out into tank A when the canway is rotated; then raise top section A1 of the tank and break steam pipe unions E and E1, then pull out the plungers 29 of canway anchors B6 to disengage same from the canway radial supports B3. Then clamp keys D10 in keyways D9 in the hubs B6 and in keyways D8 in the hub of worm gear D1 and in the collar D5, using cap screws D11 to connect canway B with the shaft C of can propeller C2. When can propeller shaft C is then rotated by worm gear D1, the entire canway B including its respective steam coils B7 and its feed and discharge chutes will be rotated on its axis in hubs B4 which are freely suspended in the tank end plates. Thus in event a bottom coil B7 of the canway assembly should burst or leak the entire canway may be rotated to bring the bursted coil up to a position where it can be repaired when the upper tank section is opened or partially opened; moreover any coil B7 may be swung away from the helix B to give give access to the canway for removing jammed cans or for remedying other trouble either from the side or from the top of the tank without necessitating draining the water from the tank or unduly cooling the interior of the cooker. When the trouble is remedied, the canway assembly can be returned to its normal position so that the discharge and inlet ports thereof are opposite those of the tank casing.

Cooking with boiling water is old in the art, and cooking with heat as above mentioned is also old, but the provision of a cooker that can cook either with boiling water at 212° F. or can cook at temperatures much higher, is new and novel. Such arrangement practically doubles the utility of a cooker, as all fruits and berries and some vegetables are cooked in boiling water, but many vegetables cannot be cooked under 240° F.

I do not limit my invention to the exact form shown in the drawings, for obviously changes may be made therein within the scope of the claims.

I claim:

1. In apparatus of the character specified, a chamber; a helical canway rotatably mounted therein; a rotatable can propeller disposed within and coaxially of the canway and provided with means to engage the cans and move them along the canway; means for rotating the propeller; means for feeding cans into the canway; means for discharging cans from the canway; means for normally maintaining the canway against rotation; and means for interlocking the can propeller and canway for rotation together.

2. In apparatus as set forth in claim 1, said chamber having feed and discharge ports in its periphery; said canway having feed and discharge ports in its periphery; feed and discharge chutes on the canway opposite the canway ports adapted to rotate therewith; said chutes in the normal position of the canway registering with the feed and discharge ports of the chamber; and closure members in the discharge chutes for controlling said canway discharge ports.

3. In apparatus as set forth in claim 1, said canway having hubs supporting its ends journaled in the chamber; and said can propeller comprising a shaft journaled in said hubs, a cylindrical shell mounted on said shaft having spaced longitudinal fins on its periphery adapted to engage the cans interposed between the turns of the canway and move same along the canway; said cylindrical shell being perforated; imperforated end plates for the shell; steam coils mounted within the shell and contacting the inner face thereof; and means for passing steam through said coils.

4. In apparatus as set forth in claim 1, said canway having hubs supporting its ends journaled in the chamber; a plurality of steam coils mounted on the exterior of the canway; steam supply and exhaust boxes in said hubs respectively; and ducts connecting the boxes with the ends of the said coils respectively.

5. In apparatus as set forth in claim 1, said canway having hubs supporting its ends journaled in the chamber; a plurality of steam coils mounted on the exterior of the canway; means for circulating steam through said coils; each coil being pivotally connected to the canway at one side whereby same may be swung outwardly away from the canway; and means for normally maintaining the coils in contact with the canway.

6. In apparatus as set forth in claim 11, said canway having hubs supporting the ends journaled in the chamber; a plurality of steam coils mounted on the exterior of the canway; steam supply and exhaust boxes on said hubs respectively; and ducts connecting the boxes with the ends of the said coils respectively; each coil being pivotally connected to the canway at one side whereby same may be swung outwardly away from the canway; and means for normally maintaining the coils in contact with the canway.

7. In apparatus of the character specified, a chamber, a helical canway rotatably mounted therein; a rotatable can propeller disposed within and coaxially of the canway and provided with means to engage the cans and move them along the canway; means for rotating the propeller; means for feeding cans into the canway; means for discharging cans from the canway; means for normally holding the canway against rotation; said chamber comprising a substantially horizontal cylindrical casing formed of upper and lower semi-cylindrical sections closed at each end; the upper section being hinged along one side edge to the lower section; and the canway being removably supported in the ends of the lower section.

8. In apparatus as set forth in claim 7, said chamber having feed ports in its upper section; said canway having feed ports in its periphery; feed chutes carried by the canway opposite canway ports adapted in the normal position of the canway to register with the chamber ports;

and inclined elevators operated by the propeller rotating means for feeding cans into said chamber ports, said elevators having their upper ends yieldably contacting said chamber, whereby said upper ends may be swung away from the chamber ports to permit the upper section of the chamber to be raised.

9. In apparatus as set forth in claim 7, said chamber having a feed port; an inclined elevator operated by the propeller rotating means for feeding cans into said port, said elevator having its upper end yieldably contacting said port, whereby said upper end may yield away from the port to eject cans whenever cans are fed thereto by the elevator in endwise position without stoppage or alteration of the rate of feeding of the cans with respect to the movement of the cans along the canway.

10. In a cooker of the character disclosed, a heating chamber, a helical canway rotatably mounted therein; a rotatable can propeller disposed within and coaxially of the canway and provided with means to engage the cans and move them along the canway, means for rotating the can propelling member; means for feeding cans to the canway, means for discharging cans from the canway; means for applying heat by conduction to the canway and propeller; and means for normally holding the canway against rotation.

11. In a cooker as set forth in claim 10, said canway having hubs supporting its ends journaled in the chamber; and said can propeller comprising a shaft journaled in said hubs, and a cylindrical shell mounted on said shaft having spaced longitudinal fins on its periphery adapted to engage the cans interposed between the turns of the canway and move same along the canway.

12. In a cooker as set forth in claim 10, said heating means for the canway comprising a series of flat coils extending longitudinally along the outer periphery of the canway, each coil being pivotally connected thereto at one side whereby same may be swung outwardly away from the canway; means for normally maintaining each coil closed against the canway; and means for passing steam through said coils.

13. In a cooker as set forth in claim 10, said can propeller comprising a perforated cylindrical shell having spaced longitudinal fins on its periphery adapted to engage the cans interposed between the turns of the canway and move same along the canway; said shell having imperforate end plates; and said propeller heating means comprising steam coils mounted in the shell and contacting the inner face of the shell; and means for passing steam through said coils.

14. In a cooker of the character specified, a heating chamber comprising a substantially horizontal cylindrical casing formed of upper and lower semi-cylindrical sections, the upper section being hinged along one side edge to the lower section; a canway rotatably supported in the chamber and comprising a helix having hubs journaled in the ends of the lower section; a can propeller within the canway and comprising a shaft journaled in said hubs, a cylindrical shell mounted on said shaft and having spaced longitudinal fins on its periphery adapted to engage the cans interposed between the turns of the helix and move same along the canway; means for feeding cans to the canway; means for discharging cans from the canway; means for rotating the shaft; and means for holding the canway against rotation.

15. In a machine of the character disclosed, a heating chamber, a helical canway therein, a rotating can propeller within the canway having means thereon to engage the cans and move them along the canway, said canway having a plurality of spaced feed ports and having a plurality of spaced discharge ports, means for opening a plurality of feed ports and a plurality of discharge ports simultaneously for short processing periods, means for closing intermediate feed ports and intermediate discharge ports so that cans may pass said intermediate feed ports and intermediate discharge ports for long processing periods, means for feeding cans to the canway, and means for discharging cans from the canway.

16. In a machine of the character disclosed, a heating chamber adapted to contain some liquid; a helical canway in said chamber; a cylindrical rotating can propeller within the canway having means on its exterior to engage the cans and move them along the canway; the periphery of said propeller being perforated to permit the free passage of steam through the propeller to the cans, the ends of the propeller being imperforate to prevent heat radiation; steam pipes on the inner surface of the propeller adapted to boil the liquid in the chamber and to superheat the steam passing through the perforations of the propeller above the liquid level to impart heat to the cans on the propeller; means for passing steam through said pipes; and means for rotating the propeller.

17. In a cooker of the character specified, a cylindrical cooking chamber; a helical canway therein; a can propeller disposed within the canway; means for feeding cans to the canway; means for discharging cans from the canway; said canway having hubs at its ends supported in the ends of said chamber; a plurality of steam coils mounted on the exterior of the canway; steam supply and exhaust boxes in said hubs respectively; and ducts connecting the boxes with the ends of the said coils respectively.

18. In a cooker as set forth in claim 17, each coil being pivotally connected to the canway at one side whereby same may be swung outwardly away from the canway; and means for normally maintaining the coils in contact with the canway.

19. In a cooker as set forth in claim 17, said cooker having feed and delivery ports, and said canway being rotatable in the cooker, feed and delivery chutes on the canway opposite the ports; and closure members in said chutes.

20. In a device of the character specified, a cylindrical cooking chamber; a helical canway therein; a can propeller disposed within the canway; means for feeding cans to the canway; means for discharging cans from the canway; said canway having hubs at its ends supported in the ends of said chamber; and said can propeller comprising a shaft journaled in said hubs, and a cylindrical shell mounted on said shaft having spaced longitudinal fins on its periphery adapted to engage the cans interposed between the turns of the canway and move same along the canway; said cylindrical shell being perforated; imperforate end plates for the shell; steam coils mounted within the shell and contacting the inner face thereof; and means for passing steam through said coils.

21. In a cooker, a heating chamber, a canway mounted therein; a can propeller for moving cans along the canway; said heating chamber comprising a substantially horizontal cylindrical casing formed of upper and lower semi-cylindrical sections hinged together along one side edge; said upper section having a can feed port; and a can elevator cooperating with said port, said elevator being hinged at its lower end to the lower section, and being upwardly inclined with its upper end contacting said port whereby said upper end may be swung away from said port to permit the upper section of the heating chamber to be raised.

22. In a machine for treating canned foods, a chamber; a helical canway therein; a rotatable can propeller disposed within and coaxially of the canway and provided with means to engage the cans and move them along the canway; means for rotating the propeller; means for feeding cans into the canway; means for discharging cans from the canway; said chamber comprising a substantially horizontal cylindrical casing formed of upper and lower semi-cylindrical sections closed at each end; the upper section being hinged along one side edge to the lower section, and the canway being mounted on the lower section.

23. In a cooker of the character specified, a heating chamber; a helical canway therein; a rotatable can propeller within the canway having means on its exterior to engage the cans and move them along the canway; a plurality of steam coils mounted exteriorly of the canway; means for circulating steam through said coils; each coil being pivotally connected whereby same may be swung outwardly away from the canway; means for normally maintaining said coils in contact with the canway; means for feeding cans into the canway; means for discharging cans from the canway; and means for rotating the propeller.

24. In a cooker of the character specified, a heating chamber adapted to hold water in the bottom thereof; a helical canway therein; a cylindrical rotating can propeller within the canway having means on its exterior to engage the cans and move them along the canway; the periphery of the propeller being perforated to permit the free passage of steam through the propeller to the cans; steam pipes on the inner surface of the propeller to boil the water in the bottom of said chamber and superheat the rising steam as it passes between said pipes to the cans on the canway; means for passing steam through said pipes; means for feeding cans to the canway; means for discharging cans from the canway; and means for rotating the propeller.

JOHN S. BAKER.